Nov. 5, 1946.   V. W. GIDEON   2,410,493
MANDREL
Filed Nov. 3, 1943
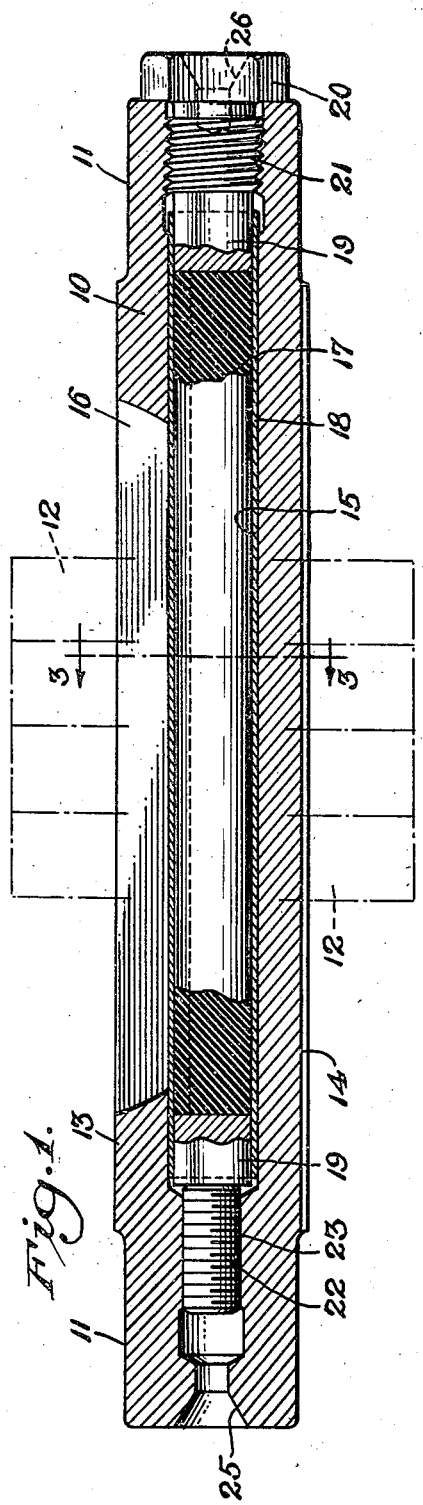
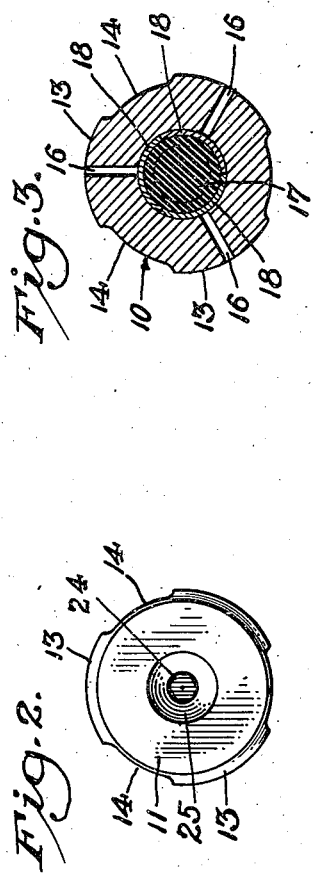
Inventor
Victor W. Gideon
BY
Parker, Carlson, Pitzner & Hubbard
Attorneys Patented Nov. 5, 1946

2,410,493

UNITED STATES PATENT OFFICE 2,410,493

MANDREL

Victor W. Gideon, Chicago, Ill., assignor to Victor W. Gideon, Hubert W. Jerry, Lauretta F. Gideon, and Louise C. Jerry, copartners doing business under the firm name of Par Manufacturing Co., Chicago, Ill.

Application November 3, 1943, Serial No. 508,836

4 Claims. (Cl. 82—44)

The invention relates to mandrels and more particularly to expansible mandrels for supporting internally bored workpieces while an operation is performed on an external area thereof.

An object of the invention is to provide a new and improved expansible mandrel in which the expanding force is hydrostatic pressure.

Another object more specifically stated is to provide a device of this character embodying a tubular body capable of substantially uniform radial expansion, and means within said body for creating hydrostatic pressure to effect such expansion of the body into gripping engagement with one or a series of workpieces mounted in encircling relation thereon.

Other objects and advantages will become apparent from the following invention and from the accompanying drawing, in which:

Figure 1 illustrates in axial section a mandrel embodying the features of the present invention.

Fig. 2 is an end view of the mandrel looking toward the left hand end thereof as shown in Fig. 1.

Fig. 3 is a cross sectional view taken along line 3—3 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the drawing which shows an exemplary form of the invention for illustrative purposes, the numeral 10 designates a mandrel body which in this instance is substantially cylindrical in shape. Between its ends 11, which are somewhat reduced in diameter, the body is finished to receive and internally engage a bore in a workpiece to be supported by the mandrel. The workpieces may be of any character and are herein illustrated by way of example as collars 12. As shown the finished workpiece engaging surface of the mandrel includes a plurality of longitudinally extending ribs 13 uniformly spaced circumferentially of the body and separated by depressions or grooves 14, three such ribs and grooves being provided in the instant form. The raised spaced faces of the ribs 13 afford accurate, precise and secure engagement with the workpiece.

The body has an internal bore 15 extending therethrough and each of the ribs 13 has a radially extending slot 16 preferably located medially of the rib and running nearly to the ends thereof. Each slot opens into the bore 15 and provides for radial expandibility of the mandrel body.

Confined within the bore 15 is a member or element which is arranged when subjected to a compression force to transmit hydrostatic pressure uniformly against the interior of the mandrel body to expand it radially outwardly. In this description of an exemplary form of the invention the hydrostatic member is shown in the form of an elongated rod 17 of rubber (either natural or synthetic). This is one preferred form of member and it will be evident that other solids having fluid characteristics like those of rubber may be used. Fluids are less desirable than a solid body because of the necessity of confining them against leakage. The rod 17 is of slightly smaller external diameter than the internal diameter of the bore to permit a series of plates 18 (one for each slot) to be interposed between the rod 17 and the wall of the bore 15. The plates together form a substantially cylindrical tube and are so positioned that each plate spans and in effect closes one of the slots 16. This arrangement insures the confinement of the hydrostatic pressure element and prevents the element material from flowing or being forced into the slots when it is placed under pressure.

In the present construction the plates 18 extend beyond the ends of the rod 17 and the sockets defined by these projecting ends snugly receive cylindrical abutments 19 of rigid material. At one end (in this instance the right hand end as shown in Fig. 1) the abutment 19 is fixed and is backed up by a plug 20 screw threaded as at 21 into the end of the mandrel body. The other abutment 19 is movable and seats on an adjusting screw 22 having screw threaded engagement with a reduced diameter end section 23 of the bore 15. The screw 22 preferably has a socket head 24 for engagement by a manipulating tool inserted through the end of the bore.

This end of the bore is preferably finished to provide a countersunk recess 25, the plug 20 at the opposite end of the mandrel being provided with a similar recess 26. These recesses 25 and 26 are for engagement by the centers of a machine tool.

In operation a workpiece is slipped over the mandrel and about the finished surfaces 13 while the mandrel body is restricted. By manipulation of the screw 22 the operator causes the movable abutment 19 to travel inwardly thereby applying force endwise to the rod 17. The resulting hydrostatic pressure exerted internally of the mandrel body expands it radially outwardly and effects a firm-holding engagement between the surfaces 13 and the workpiece.

Besides its simplicity of construction and operation the present mandrel has other advantages of considerable importance. A mandrel constructed in accordance with the present disclosure has a wide operative range of expansion as compared with those of other mandrels with which I am familiar. A small operative range of course necessitates the provision of a mandrel having an external diameter almost precisely equal to the internal diameter of the bore in the workpiece. This of course requires the maintenance of relatively close tolerances on the internal diameter of the workpiece. In the present mandrel these difficulties are not present since the hydrostatic pressure that may be created and exerted on the mandrel body will expand the body through a relatively wide range. Indeed, the hydrostatic pressure, exerted as it is uniformly throughout the interior of the mandrel bore, will cause the body of the mandrel to expand radially on either side of a workpiece mounted thereon. As a result a series of workpieces may be mounted on the mandrel in abutting relation and each workpiece will be securely engaged by the mandrel even though the internal diameters of the bore of the several workpieces vary within manufacturing tolerances.

I claim as my invention:

1. In an expansible mandrel the combination of a body having an internal bore therein, said body being longitudinally slotted at circumferentially spaced intervals to provide radial expansibility to the body portions between the slots, closure means abutting the inner wall of the bore and extending lengthwise in spanning relation to said slots, a rubber element seated in said bore in engagement with said closure means, and capable of translating applied force into hydrostatic pressure, and means at the ends of said bore in abutting relation to said element, one of said means being movable to apply force to said element.

2. In an expansible mandrel the combination of a body having an internal bore therein, said body being longitudinally slotted at circumferentially spaced intervals to provide radial expansibility to the body portions between the slots, a rubber element in said bore capable of translating applied force into hydrostatic pressure, element retaining means disposed between the body and element extending lengthwise in spanning relation to said slots, and closure means at the ends of said bore engaging said element, one of said closure means being movable, and means for shifting the movable closure means to apply force to said element.

3. In an expansible mandrel the combination of a body having an internal bore therein, said body having spaced longitudinally extending ribs thereon each provided with a longitudinally extending slot, an elongated rubber element in said bore capable of translating applied force into hydrostatic pressure, slot spanning means in said bore substantially enclosing said element, a fixed abutment for said element at one end of said bore, a movable abutment for said element at the other end of said bore, and means acting thru said movable abutment for applying force to said element.

4. In an expansible mandrel the combination of a tubular body longitudinally slotted at circumferentially spaced intervals, elongated strips disposed against the inner wall of the bore in spanning relation to said slots, a rod of rubber in said bore and engaging said strips, a rigid abutment at each end of said rod, said strips extending beyond the ends of said rod to overlap said abutments, a plug at one end of said body engaging the abutment associated therewith, and a screw at the other end of said body engaging its associated abutment and operable to move said abutment to apply force to said rod.

VICTOR W. GIDEON.